United States Patent
Chien et al.

(10) Patent No.: US 11,287,929 B1
(45) Date of Patent: Mar. 29, 2022

(54) METHOD FOR LOCATING TOUCHED POSITION, LOCATING DEVICE, AND TOUCH DISPLAY DEVICE

(71) Applicant: JADARD TECHNOLOGY INC., Shenzhen (CN)

(72) Inventors: Chih-Wei Chien, Shenzhen (CN); Feng-Liang Huang, Shenzhen (CN); Chien-Hung Chen, Shenzhen (CN); Da-Ming Dai, Shenzhen (CN)

(73) Assignee: JADARD TECHNOLOGY INC., Shenzhen (CN)

( * ) Notice: Subject to any disclaimer, the term of this patent is extended or adjusted under 35 U.S.C. 154(b) by 0 days.

(21) Appl. No.: 17/153,040

(22) Filed: Jan. 20, 2021

(30) Foreign Application Priority Data

Nov. 13, 2020 (CN) .......................... 202011267851.4

(51) Int. Cl.
*G06F 3/041* (2006.01)
*G06F 3/044* (2006.01)

(52) U.S. Cl.
CPC ........ *G06F 3/04186* (2019.05); *G06F 3/0446* (2019.05)

(58) Field of Classification Search
CPC ..... G06F 3/04186; G06F 3/0446; G06F 3/044
See application file for complete search history.

(56) References Cited

U.S. PATENT DOCUMENTS

| | | | | |
|---|---|---|---|---|
| 2009/0284495 | A1* | 11/2009 | Geaghan | G06F 3/04883 345/174 |
| 2010/0134440 | A1* | 6/2010 | Hayakawa | G06F 3/0447 345/174 |
| 2011/0037724 | A1* | 2/2011 | Paulsen | G06F 3/0446 345/174 |
| 2011/0050618 | A1* | 3/2011 | Murphy | G06F 3/04166 345/174 |
| 2011/0148788 | A1* | 6/2011 | Wu | G06F 3/0414 345/173 |
| 2011/0298734 | A1* | 12/2011 | Ho | G06F 3/04166 345/173 |
| 2011/0310040 | A1* | 12/2011 | Ben-Shalom | G06F 3/04186 345/173 |
| 2012/0062474 | A1* | 3/2012 | Weishaupt | G06F 3/04182 345/173 |
| 2012/0086666 | A1* | 4/2012 | Badaye | G06F 3/0416 345/174 |
| 2012/0262419 | A1* | 10/2012 | Hershman | G06F 3/0443 345/174 |

(Continued)

*Primary Examiner* — Ibrahim A Khan
(74) *Attorney, Agent, or Firm* — ScienBiziP, P.C.

(57) ABSTRACT

A method for locating a touched position on a touch panel acquires a sensing signal from a sensing area on the touch panel when the touch panel is touched. A determination is made as to whether the sensing signal of the sensing area on the touch panel is a touch signal and if so, sorting all the touch signals to obtain a decreasing sequence of strength of touch signals. Selection of groups of all the touch signals in the decreasing sequence is carried out according to a direction of decrease of strength, to divide all the touch areas into at least one group. Calculating a physical center of each of the at least one group, wherein the touch position of each of the groups is taken as the physical center and point of origin of the coordinates.

7 Claims, 5 Drawing Sheets

(56) References Cited

U.S. PATENT DOCUMENTS

| | | | |
|---|---|---|---|
| 2013/0016045 A1* | 1/2013 | Zhao | G06F 3/04883 345/173 |
| 2013/0176270 A1* | 7/2013 | Cattivelli | G06F 3/0488 345/174 |
| 2015/0242052 A1* | 8/2015 | Gao | G06F 3/0446 345/178 |
| 2020/0371662 A1* | 11/2020 | Shi | G06F 3/044 |

* cited by examiner

METHOD FOR LOCATING TOUCHED POSITION, LOCATING DEVICE, AND TOUCH DISPLAY DEVICE

FIELD

The subject matter herein relates to human-computer interaction, specifically a method for locating a touched position, a locating device, and a touch display device.

BACKGROUND

Types and functions of display screens are many. In particular, touch display screens are widely used in various display devices. The touch display screen includes a plurality of sensing areas for sensing signals. When the touch display screen is touched, a touched sensing area is defined as a touch area, and the signal sensed by the sensing area is defined as a touch signal. The touch screen often needs to recognize the touched position of the touch signal on the touch screen to respond. In order to locate and recognize the touch position, it is necessary to perform group selection for all touch signals.

That is, all the touch signals are classified to obtain at least one group signal, and then the coordinates of the physical center of the touch area corresponding to all the touch signals in each group on the panel are calculated to locate the touched position.

In the existing methods for locating touch positions, the touch areas corresponding to the touch signals are divided into different groups by using the distance between the touch areas and the values of the touch signals, and the groups are selected by returning to the starting point of each group many times and expanding outward. This kind of group selection methods is time-consuming, repetitious, and multiple returns takes up more memory space for storage.

Therefore, there is room for improvement in the art.

BRIEF DESCRIPTION OF THE DRAWINGS

Implementations of the present disclosure will now be described, by way of embodiment, with reference to the attached figures.

DETAILED DESCRIPTION

Figure 1:
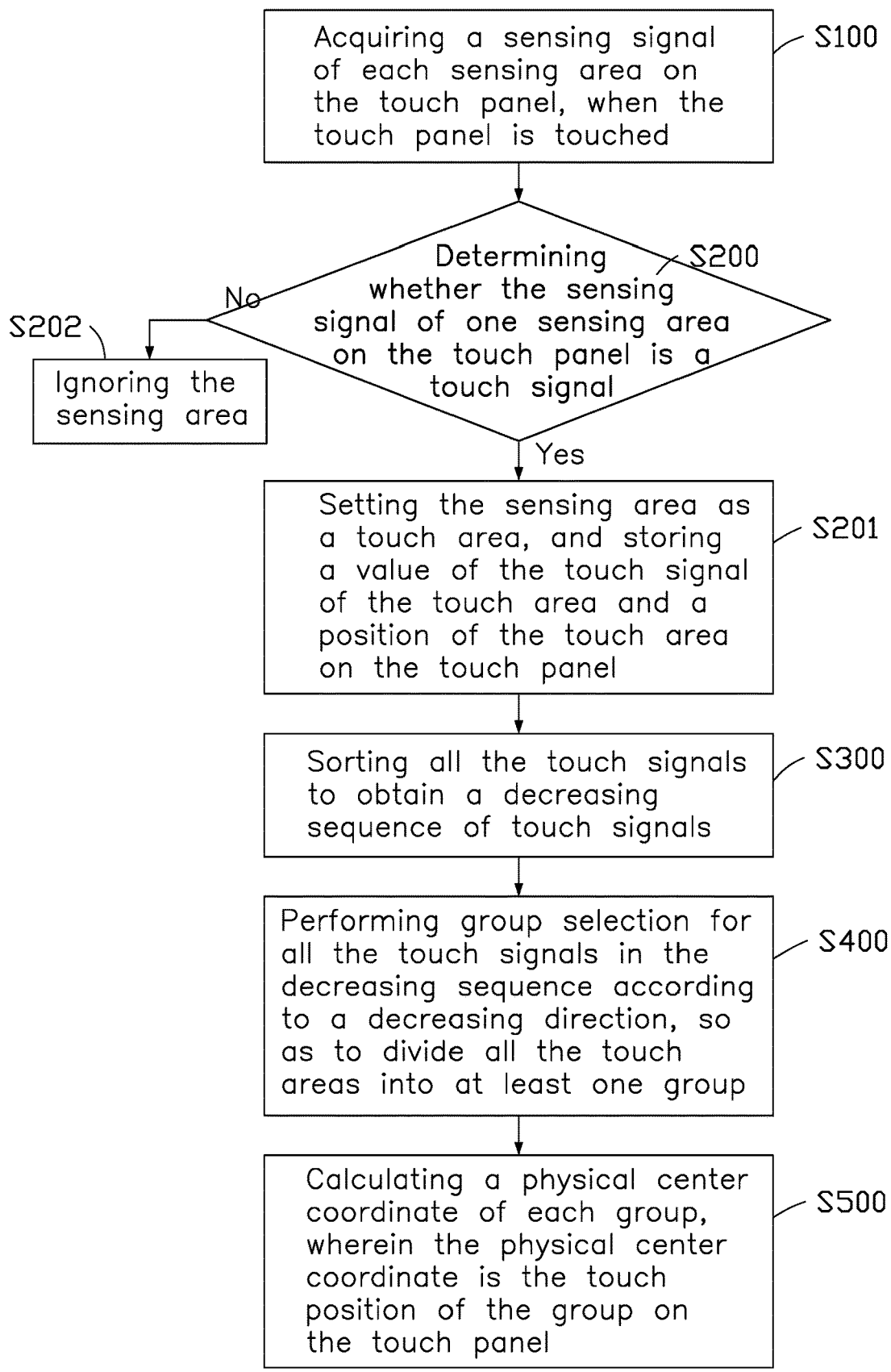
FIG. 1 is a flowchart of a method for locating a touched position according to an embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale, and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". The term "circuit" is defined as an integrated circuit (IC) with a plurality of electric elements, such as capacitors, resistors, amplifiers, and the like.

First Embodiment

The first embodiment of the present disclosure provides a method for locating a touched position. The method is configured for locating a touched position on a touch panel. The touch panel includes a plurality of sensing areas for sensing touch operations. In one embodiment, the plurality of sensing areas is arranged in rows along a X direction and in columns along a Y direction. The X direction and the Y direction are mutually perpendicular directions in a two-dimensional rectangular coordinate system. Touch electrodes are arranged in each of the sensing areas. In one embodiment, a value of a signal in each of the sensing areas is a capacitance value formed by the touch electrodes in the sensing area.

FIG. 1 shows a flowchart of the method for locating a touch position according to an embodiment. The example method is provided by way of example, as there are a variety of ways to carry out the method. The method described below can be carried out using the configurations illustrated in FIG. 1, for example, and various elements of these figures are referenced in explaining the example method. Each block shown in FIG. 1 represents one or more processes, methods, or subroutines carried out in the example method. Furthermore, the illustrated order of blocks is by example only, and the order of the blocks can be changed. Additional blocks can be added, or fewer blocks can be utilized, without departing from this disclosure. The example method can begin at block S100.

At block. S100, a signal of each sensing area on the touch panel is sensed when the touch panel is touched.

At block S200, the signal of one sensing area on the touch panel is determined to be a touch signal or not a touch signal. When the sensing signal of one sensing area on the touch panel is determined to be a touch signal, block S201 is performed; otherwise, block S202 is performed.

At block S201, the sensing area is set as a touch area, and a value of the touch signal of the touch area and a position of the touch area on the touch panel is stored.

At block S202, the sensing area is ignored.

At block S300, all the touch signals are sorted to obtain a sequence of decreasing touch signals.

At block S400, group selection is performed for all the touch signals in the decreasing sequence according to a direction of decrease to divide the touch areas into at least one group.

At block S500, a physical center coordinate of each group is calculated, wherein the physical center coordinate is the touch position of the group on the touch panel.

In one embodiment, the decreasing direction is defined as a direction of decrease of the values of all the touch signals in the decreasing sequence. In one embodiment, one touch signal corresponds to one sensing area. When the sensing signal of a sensing area is determined to be a touch signal, then the sensing area is deemed to be a touch area. The touch signal value of the touch area is the sensing signal value of the sensing area of the touch area and the position of the touch area on the touch panel is the position of the sensing area on the touch panel. The position of the touch area on the touch panel is represented by coordinates in a two-dimensional rectangular coordinate system, which is composed of mutually perpendicular X and Y directions.

In one embodiment, a bubble sorting method is used to sort values of all the touch signals from largest to smallest, to obtain the decreasing sequence. In other embodiments, the sorting method is not limited to the bubble sorting method. The bubble sorting method is a simple sorting algorithm in the field of computer science.

In one embodiment, all the touch signals in the decreasing sequence are defined as the first to nth touch signals according to the direction of decrease, wherein n is a natural number greater than 0.

Figure 2:
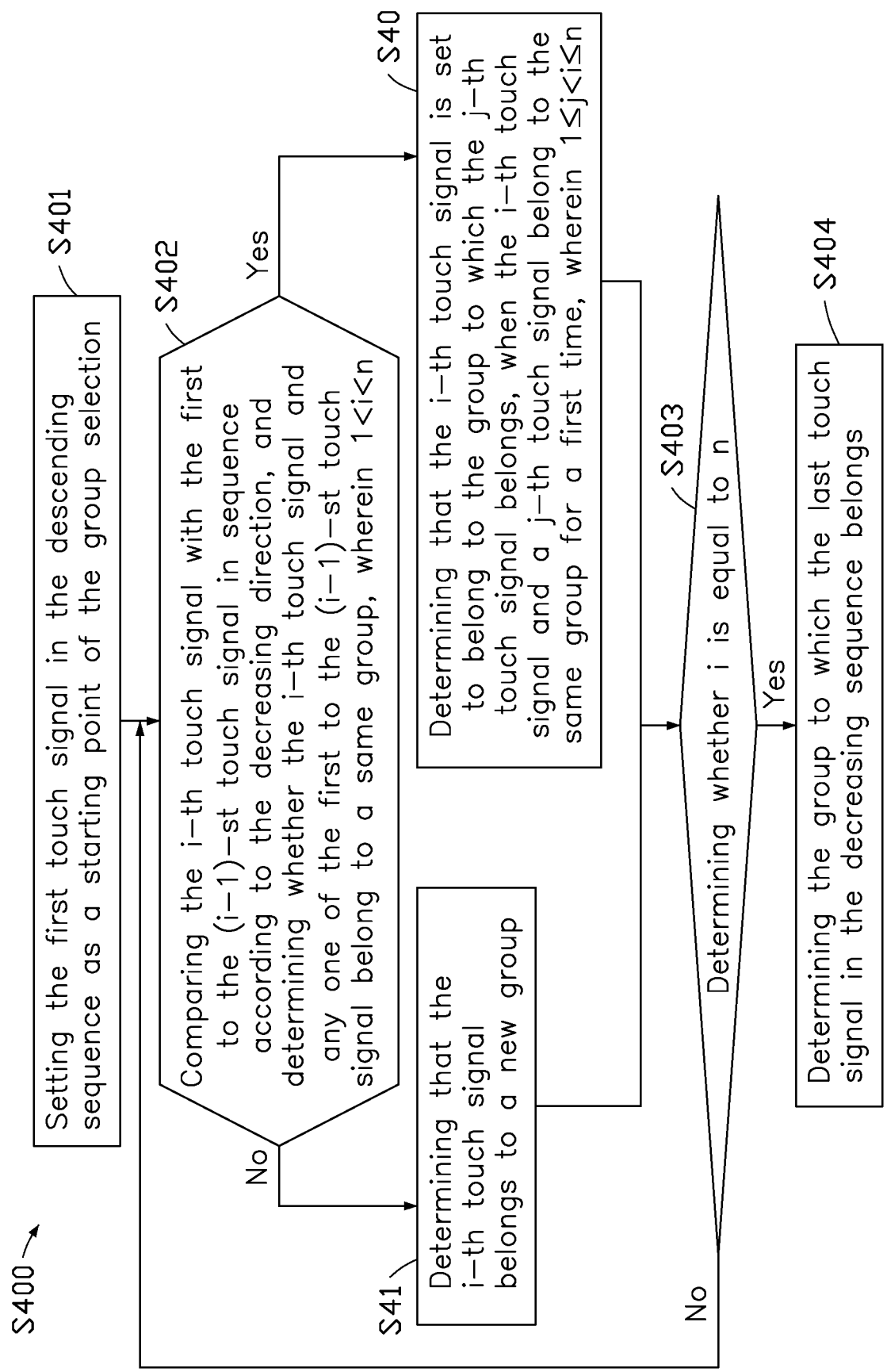
FIG. 2 is a flowchart showing steps of group selection in block S400 of the method disclosed in FIG. 1.

As shown in FIG. 2, the step of selection of a group of the touch signals in the decreasing sequence according to the direction of decrease in block S400 includes the following steps.

At block S401, the first touch signal in the decreasing sequence is set as the starting point of the group selection. In the decreasing sequence, the signal value of the first touch signal in the decreasing sequence is the largest.

At block S402, the i-th touch signal is compared with previous (i−1) touch signals (i.e., the first to the (i−1)-th touch signals) in sequence according to the decreasing direction, and the group identity of the i-th touch signal and any one of the previous (i−1) touch signals is determined. A determination is made as to whether such touch signals belong to same group, 1<i≤n. When the i-th touch signal and any one of the previous (i−1) touch signals are found to belong to a same group, block S40 is performed, otherwise, block S41 is performed.

At block S40, when the i-th touch signal and the previous j-th touch signal are found to belong to the same group for a first time, the i-th touch signal is set to belong to the group to which the j-th touch signal belongs, wherein i is greater than j, according to the decreasing direction. In this case, the j-th touch signal is sorted before the i-th touch signal, and the j-th touch signal is any one of the (i−1) touch signals in front of the i-th touch signal. That is 1≤j≤i−1, After block S40 is executed, block S403 is executed.

At block S41, when the i-th touch signal and any one of the previous (i−1) touch signals do not belong to the same group, it is determined that the i-th touch signal belongs to a new group. After block S41 is executed, block S403 is executed.

At block S403, it is determined whether the i-th touch signal is the last touch signal arranged in the decreasing direction. That is, the i-th touch signal being or not being the n-th touch signal is determined. That is, it is determined whether i is equal to n. When the i-th touch signal is the last touch signal arranged in the decreasing direction, block S404 is performed, otherwise, block S402 is performed. That is, group selection, is continued to be performed.

In one embodiment, block S402 is executed on a cyclic basis until the i-th touch signal is found to be the last touch signal arranged in the decreasing direction.

In one embodiment, one group is obtained when the touch panel is touched at a single point, and multiple groups are obtained when the touch panel is touched at multiple points. Touch areas belonging to one group are labeled with the same label value. In one embodiment, i, j, and n are all natural numbers greater than 0, and 1≤j≤i≤n.

Figure 3:
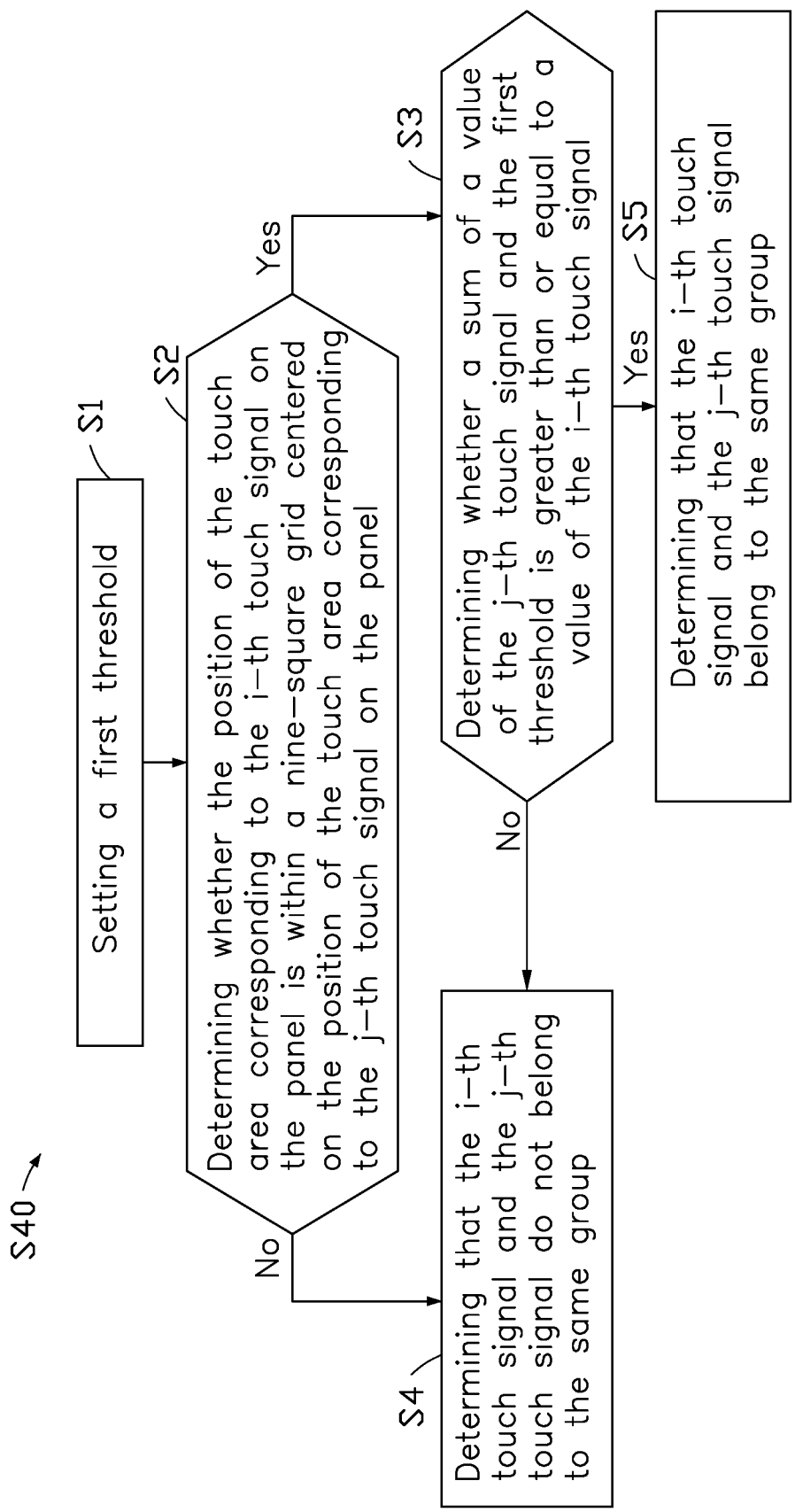
FIG. 3 is a flowchart showing steps of determining whether an i-th touch signal and a j-th touch signal belong to the same group in block S40 of the method disclosed in FIG. 1.

As shown in FIG. 3, the step of determining whether the i-th touch signal and the j-th touch signal belong to the same group in block S40 includes the following steps.

At block S1, a first threshold is set.

At block S2, it is determined whether the position of the touch area corresponding to the i-th touch signal on the panel is within a nine-square grid centered on the position of the touch area corresponding to the j-th touch signal on the panel. When such position is within the nine-square grid, block S3 is performed, otherwise, block S4 is performed.

At block S3, it is determined whether a sum of a value of the j-th touch signal and the value of the first threshold is greater than or equal to a value of the i-th touch signal. When such sum is found to be equal to or greater than the value of the i-th touch signal, block S5 is performed, otherwise, block S4 is performed.

At block S4, it is determined that the i-th touch signal and the j-th touch signal do not belong to the same group.

At block S5, it is determined that the i-th touch signal and the j-th touch signal belong to the same group.

In one embodiment, determining whether the i-th touch signal and the j-th touch signal belong to the same group must be carried out at the same time where the position of the touch area corresponding to the i-th touch signal on the panel is within the nine-square grid centered on the position of the touch area corresponding to the j-th touch signal on the panel, and the sum of the value of the j-th touch signal and the first threshold value is greater than or equal to the value of the i-th touch signal. The nine-square grid is formed by nine squares (i.e., nine of the plurality of sensing areas) arranged into a 3×3 array.

In one embodiment, it is first determined whether the touch area corresponding to the i-th touch signal is within the nine-square grid centered on the position of the touch area corresponding to the j-th touch signal on the panel. When the touch area corresponding to the i-th touch signal is within the nine-square grid, it is then determined whether the sum of the value of the j-th touch signal and the value of the first threshold is greater than or equal to the value of the i-th touch signal.

In one embodiment, it is determined whether the sensing signal of each sensing area on the touch panel is a touch signal. This eliminates signals of non-touch signals as interference and excludes signals which have a value too small relative to the touch signal value. The step of determining whether the sensing signal of each sensing area on the touch panel is a touch signal includes setting a second threshold and comparing a value of sensing signal of each sensing area with that of the second threshold. When the value of the sensing signal is greater than the second threshold, the sensing signal is deemed a touch signal. After interference signals (non-touch signals) are eliminated, it is convenient for subsequent group selection. In one embodiment, the second threshold value and the sensing signal are the same type of value (capacitance value), which is used to determine whether the sensing signal of each sensing area is a touch signal. In one embodiment, the second threshold is set to 80, and the sensing signal less than 80 is a non-touch signal. The second threshold value may be an empirical value, an optimal second threshold may be obtained through continuous debugging.

For touch signals belonging to the same group, the physical (geometric) center coordinates of each of the group is calculated according to the following formula, and the coordinates of each of the group are represented by (x, y) over the physical center;

$$x = \left[\frac{(\Sigma(V_i \times C_{xi})) \times P_x}{G_r}\right], y = \left[\frac{\Sigma(V_i \times C_{yi})) \times P_y}{G_r}\right];$$

Wherein, x represents a coordinate value in the X direction, y represents a coordinate value in the Y direction, and the X direction and the Y direction are mutually perpendicular directions in a two-dimensional rectangular coordinate system. The i represents the i-th touch signal sorted along the decreasing direction and belonging to the group, $V_i$ represents the value of the i-th touch signal, and $C_{xi}$ represents a channel index in the X direction of the touch area corresponding to the i-th touch signal. $C_{yi}$ represents a channel index in the Y direction of the touch area corresponding to the i-th touch signal, $P_x$ is a number of pixels occupied by each of the plurality of sensing areas in the X direction, and $P_y$ is a number of pixels occupied by each of the plurality of sensing areas in the Y direction. The $\Sigma$ means to sum the values $V_i \times C_{xi}$ about the touch signals in the group, [ ] represents a result of rounding $$\frac{(\Sigma(V_i \times C_{xi})) \times P_x}{W_g}$$

or $$\frac{\Sigma(V_i \times C_{yi})) \times P_y}{W_g},$$

and $G_r$ represents a sum of the values of all the touch signals in the group. In one embodiment, the channel index of the i-th touch signal in the X direction is the number of rows in the X direction of the sensing area corresponding to the i-th touch signal, and the channel index of the i-th touch signal in the Y direction is the number of columns in the Y direction of the sensing area corresponding to the i-th touch signal.

In one embodiment, the touch panel is evenly divided into uniform sensing areas. That is, the area, size, and shape of each sensing area are the same. Since each of the touch areas corresponds to one sensing area, the area, size, and shape of each touch area are the same. A resolution of the touch panel is M×N, and a resolution of one sensing area is $B_x \times B_y$, then $P_x = M/B_x$, $P_y = M/B_y$. For example, the resolution of the touch panel is M×N=480×480, and the resolution of one sensing area is $B_x \times B_y$=10×10 (that is, there are ten sensing areas in both the X direction and the Y direction), thus $$P_x \frac{M}{B_x} = 48, P_y = \frac{M}{B_y} = 48.$$

The method for locating a touched position obtains a decreasing sequence of touch signals by sorting all the touch signals and selecting the touch signals in the decreasing sequence according to the direction of decrease. By performing group selection according to the decreasing direction, this reduces repetition, thereby reducing the time required for locating the touch positions, and effectively locating the touch position.

Embodiment of a Locating Device

Figure 4:
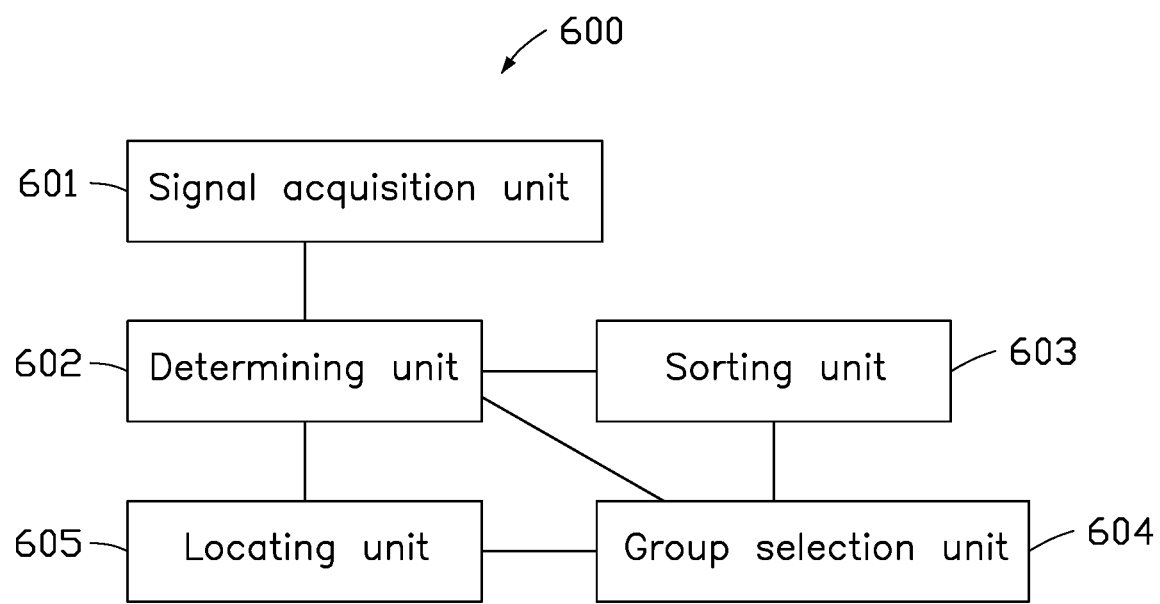
FIG. 4 is a schematic diagram of a touch locating device according to an embodiment.

FIG. 4 shows a locating device 600 according to one embodiment. The locating device 600 is configured for locating a touched position on a touch panel. The touch panel includes a plurality of sensing areas for sensing touch operations. The locating device 600 includes a signal acquisition unit 601, a determining unit 602, a sorting unit 603, a group selection unit 604, and a locating unit 605. The signal acquisition unit 601 is configured for acquiring sensing signals of each of the plurality of sensing areas on the touch panel. The determining unit 602 is configured for receiving all the sensing signals in the signal acquisition unit 601 and determining whether the sensing signal of each sensing area on the touch panel is a touch signal. The determining unit 602 sets one of the sensing areas as a touch area and stores a value of the touch signal of the touch area and a position of the touch area on the touch panel, when the sensing signal of the one of the sensing areas is determined to be a touch signal. The determining unit 602 ignores any sensing areas from which the sensing signal of the one of the sensing areas is deemed not to be a touch signal. The sorting unit 603 performs data communication with the determining unit 602 and is configured for sorting all the touch signals to obtain a decreasing sequence of touch signals. The group selection unit 604 receives the data in the determining unit 602 and the sorting unit 603 and is configured for performing group selection for all the touch signals in the decreasing sequence according to direction of decrease, so as to divide all the touch areas into at least two groups. The locating unit 605 receives the data from the group selection unit 604 and the determining unit 602 to allow calculation of a geometric or physical center of each group. The physical center of each group is the touch position on the touch panel.

Embodiment of a Display Device

Figure 5:
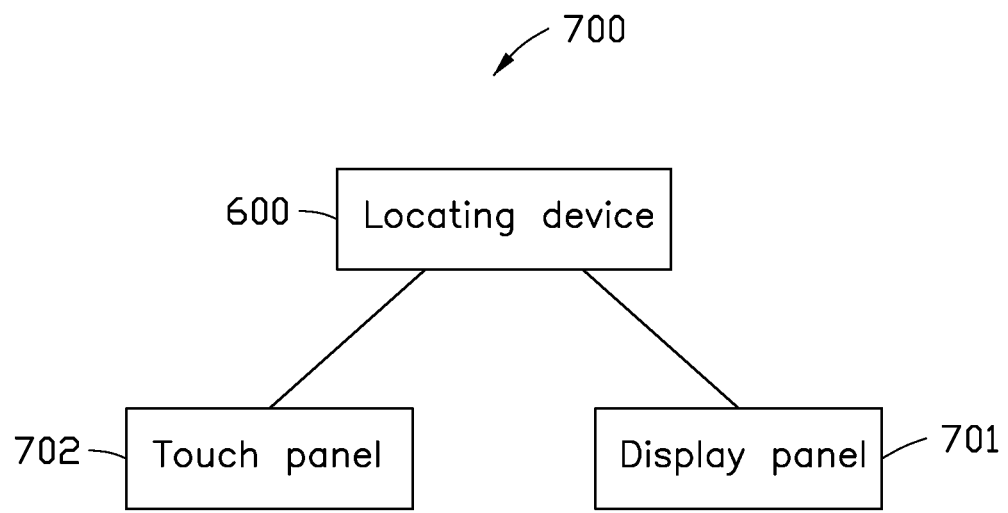
FIG. 5 is a schematic diagram of a touch display device using the locating device in FIG. 4 according to an embodiment.

FIG. 5 shows a touch display device 700 according to one embodiment. The touch display device 700 includes a display panel 701, a touch panel 702, and the locating device 600. The display panel 701 is used to display images, and the locating device 600 is used to locate a touch position of a user command on the touch panel 702. The display panel 701 may be, but is not limited to, a liquid crystal display (LCD) panel or an organic light emitting diode ((SLED) display panel.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. A method for locating a touch position on a touch panel comprising a plurality of sensing areas for sensing touch operations, comprising:

acquiring a sensing signal of each of the plurality of sensing areas on the touch panel, when the touch panel is touched;

determining whether the sensing signal of each of the plurality of sensing areas on the touch panel is a touch signal; if the sensing signal of any of the plurality of sensing areas is a touch signal, setting the sensing area having the touch signal as a touch area, and storing a value of the touch signal of the touch area and a position of the touch area on the touch panel; and otherwise ignoring the sensing area;

sorting all the touch signals to obtain a decreasing sequence of touch signals;

performing group selection for all the touch signals in the decreasing sequence according to a direction of decrease to divide all the touch areas into at least one group; and calculating a physical center coordinate of each of the at least one group, wherein the physical center coordinate is the touch position of each of the at least one group on the touch panel;

wherein performing the group selection for all the touch signals in the decreasing sequence according to the direction of decrease comprises:

defining all the touch signals in the decreasing sequence as the first to the nth touch signals according to the direction of decrease;

setting the first touch signal in the decreasing sequence as a starting point of the group selection;

comparing the i-th touch signal with the first to the (i−1)-th touch signals in sequence according to the direction of decrease, and determining whether the i-th touch signal and any one of the first to the (i−1)-th touch signals belong to a same group; wherein when the i-th touch signal and a j-th touch signal belong to the same group for a first time, the i-th touch signal is set to belong to the group to which the j-th touch signal belongs; when the i-th touch signal and any one of the first touch signal to the (i−1)-th touch signal do not belong to the same group, it is determined that the i-th touch signal belongs to a new group; wherein 1≤j≤i≤n.

2. The method for locating a touch position of claim 1, wherein determining whether the i-th touch signal and the j-th touch signal belong to the same group comprises:

setting a first threshold; and determining whether the i-th touch signal and the j-th touch signal meet a requirement that the position of the touch area corresponding to the i-th touch signal on the panel is within a nine-square grid centered on the position of the touch area corresponding to the j-th touch signal on the panel, and a sum of a value of the j-th touch signal and the first threshold is greater than or equal to a value of the i-th touch signal, and determining the i-th touch signal and the j-th touch signal belong to the same group if yes, and otherwise the i-th touch signal and the j-th touch signal do not belong to the same group;

wherein the nine-square grid is formed by nine of the plurality of sensing areas arranged into a 3×3 array.

3. The method for locating a touch position of claim 2, wherein determining whether the i-th touch signal and the j-th touch signal belong to the same group further comprises:

first determining whether the position of the touch area corresponding to the i-th touch signal on the panel is within the nine-square grid centered on the position of the touch area corresponding to the j-th touch signal on the panel; and then determining whether the sum of the value of the j-th touch signal and the first threshold is greater than or equal to the value of the i-th touch signal.

4. The method for locating a touch position of claim 1, wherein for touch signals belonging to the same group, the physical center coordinate of each of the at least one group is calculated according to the following formula, and the physical center coordinate of each of the at least one group is represented by (x, y):

$$x = \left[\frac{(\Sigma(V_i \times C_{xi})) \times P_x}{G_r}\right], y = \left[\frac{\Sigma(V_i \times C_{yi})) \times P_y}{G_r}\right];$$

wherein, x represents a coordinate value in a X direction, y represents a coordinate value in a Y direction, and the X direction and the Y direction are mutually perpendicular directions in a two-dimensional rectangular coordinate system;

i represents the i-th touch signal sorted along the direction of decrease and belonging to the group, $V_i$ represents the value of the i-th touch signal;

$C_{xi}$ represents a channel index in the X direction of the touch area corresponding to the i-th touch signal;

$C_{yi}$ represents a channel index in the Y direction of the touch area corresponding to the i-th touch signal;

$P_x$ is a number of pixels occupied by each of the plurality of sensing areas in the X direction;

$P_y$ is a number of pixels occupied by each of the plurality of sensing areas in the Y direction;

Σ means to sum the values $V_i \times C_{xi}$ about the touch signals in the group;

[ ] represents a result of rounding $$\frac{(\Sigma(V_i \times C_{xi})) \times P_x}{W_g}$$

or $$\frac{\Sigma(V_i \times C_{yi})) \times P_y}{W_g};$$

$G_r$ represents a sum of the values of all the touch signals in the group.

5. The method for locating a touch position of claim 4, wherein a resolution of the touch panel is M×N, and a resolution of one of the plurality of sensing areas is $B_x \times B_y$, thus $P_x=M/B_x$, $P_y=M/B_y$.

6. The method for locating a touch position of claim 1, wherein whether the sensing signal of each of the plurality of sensing areas on the touch panel is a touch signal comprises:

setting a second threshold; and comparing a value of sensing signal of each of the plurality of sensing areas with the second threshold, wherein when the value of sensing signal is greater than the second threshold, the sensing signal is a touch signal.

7. The method for locating a touch position of claim 1, wherein bubble sorting method is used to sort values of all the touch signals from largest to smallest by to obtain the decreasing sequence.

* * * * *